United States Patent [19]
Calapp et al.

[11] Patent Number: 5,746,955
[45] Date of Patent: May 5, 1998

[54] PROCESS FOR MAKING A COMPOSITE HOCKEY STICK SHAFT

[75] Inventors: David E. Calapp, Redmond; Michael T. Bennett, Bellingham, both of Wash.

[73] Assignee: Christian Brothers, Inc., Warroad, Minn.

[21] Appl. No.: 484,351

[22] Filed: Jun. 7, 1995

Related U.S. Application Data

[62] Division of Ser. No. 976,523, Nov. 16, 1992, abandoned.

[51] Int. Cl.$^6$ .......................... B29C 45/14; B29C 45/63; B29C 53/76
[52] U.S. Cl. .......................... 264/103; 264/138; 264/257; 264/258; 264/271.1; 264/294
[58] Field of Search .......................... 264/257, 258, 264/263, 255, 271.1, 163, 138, 161, 103, 275, 294

[56] References Cited

U.S. PATENT DOCUMENTS

| | | | |
|---|---|---|---|
| 3,374,503 | 3/1968 | Boniger | 264/263 |
| 3,982,760 | 9/1976 | Tiitola | |
| 4,052,499 | 10/1977 | Goupil et al. | 264/266 |
| 4,086,115 | 4/1978 | Sweet, Jr. et al. | |
| 4,134,587 | 1/1979 | Diederich | |
| 4,361,325 | 11/1982 | Jansen | |
| 4,591,155 | 5/1986 | Adachi | |
| 4,684,130 | 8/1987 | Drolet et al. | |
| 4,822,548 | 4/1989 | Hempel | 264/103 |
| 4,943,333 | 7/1990 | Chang | 264/257 |
| 4,952,358 | 8/1990 | Okina et al. | 264/257 |
| 4,993,740 | 2/1991 | Recher et al. | 264/257 |
| 5,050,878 | 9/1991 | Deleris | |
| 5,112,419 | 5/1992 | Nakagawa | 264/272.11 |

FOREIGN PATENT DOCUMENTS

| | | |
|---|---|---|
| 1069147 | 1/1980 | Canada |
| 3238117 | 6/1983 | Germany |
| 3344781 | 6/1984 | Germany |

*Primary Examiner*—Angela Y. Ortiz
*Attorney, Agent, or Firm*—Dorsey & Whitney LLP

[57] ABSTRACT

A composite hockey stick shaft adapted for receiving a replacement blade. The composite shaft includes a shaft body formed of a resin material and embodying a spirally wound plurality of filaments embedded in the resin material. The present invention also relates to a process for making such a composite hockey stick shaft.

29 Claims, 2 Drawing Sheets

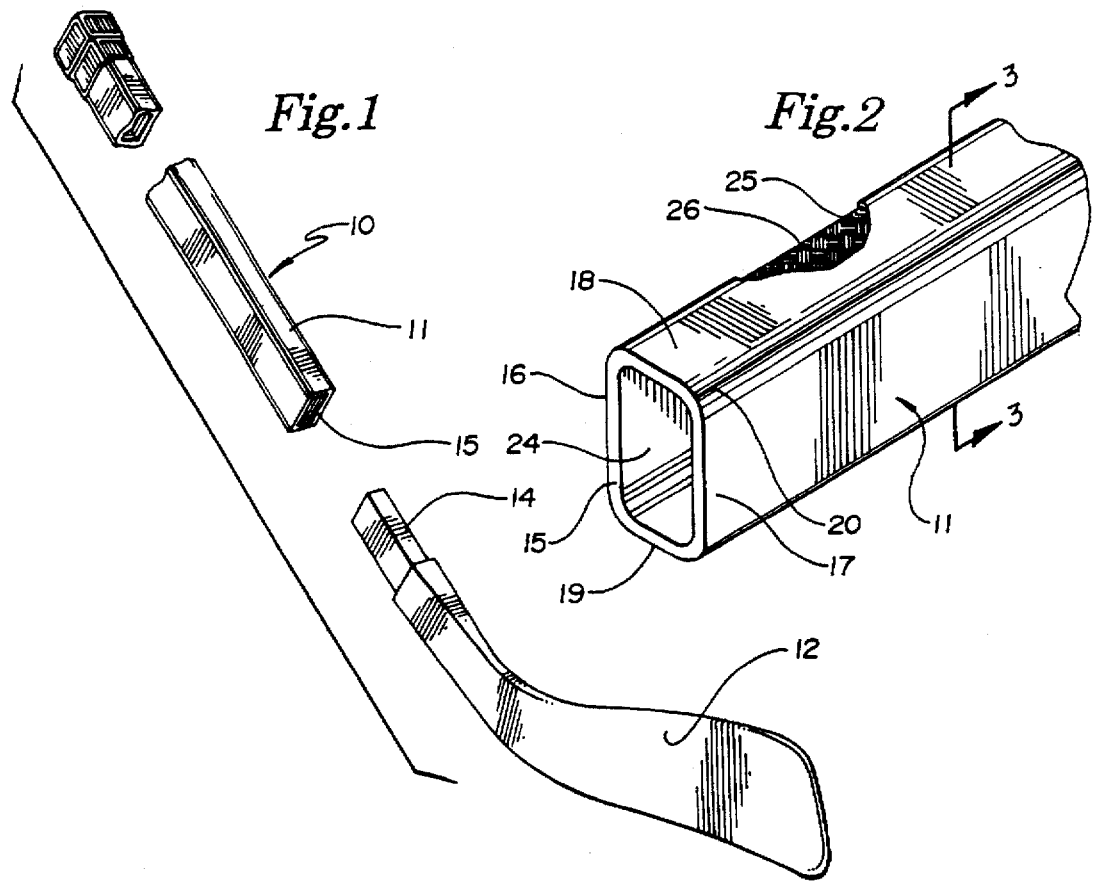
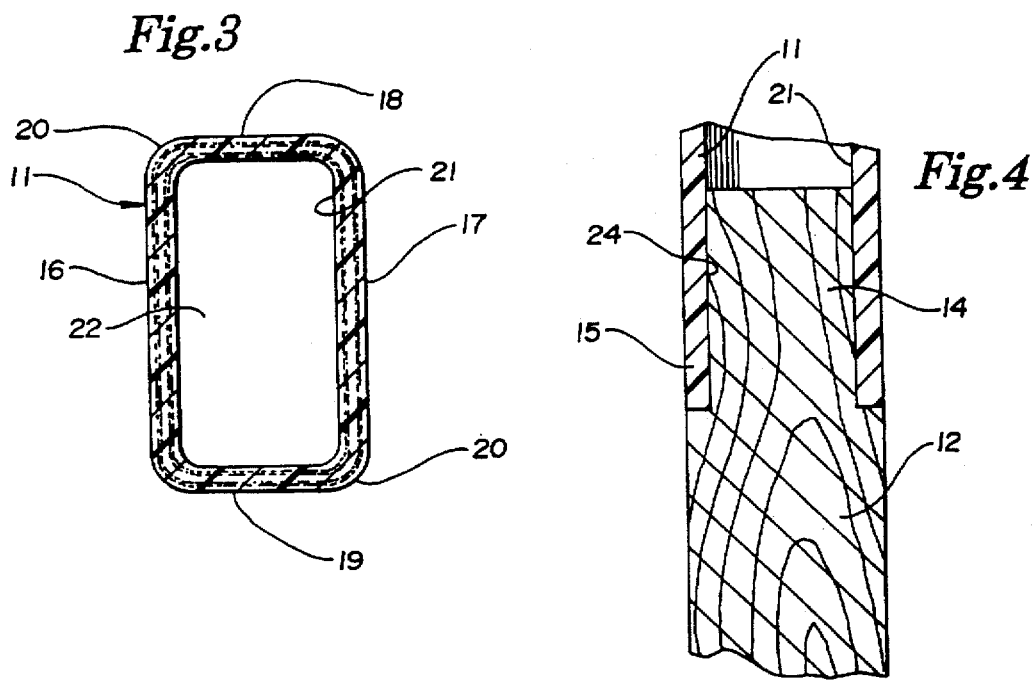

PROCESS FOR MAKING A COMPOSITE HOCKEY STICK SHAFT

This is a division of application Ser. No. 07/976,523 filed Nov. 16, 1992, now abandoned.

BACKGROUND OF THE INVENTION

1. Field of the Invention

The present invention relates generally to the field of hockey sticks and like, and more particularly, to a composite ice hockey stick shaft adapted for receiving a replacement blade at one end and a process for making such a shaft.

2. Description of the Prior Art

Hockey sticks in general, and particularly ice hockey sticks, have experienced dramatic changes throughout the years. As a result, ice hockey sticks have changed from a plain wooden stick having a straight blade and handle to a significantly improved stick having a curved blade and being reinforced with fiberglass or the like.

Significant evolution has also occurred in construction of the stick itself. Initially, the handle and blade portions were both constructed of wood and were joined with one another through various processes to form a single, integral unit. As technology developed, metal handles, particularly aluminum handles or shafts, were introduced. Such handles or shafts include an elongated handle portion constructed of a tubular section of aluminum or other light weight metal with an end for connection with a replaceable blade. The replaceable blades are usually purchased separately from the handle and include a blade portion and a shaft connecting end designed for connection through various adhesive means or the like to the aluminum handle. When a blade breaks or wears out, such blade is replaced with a new one.

A more recent development of ice hockey sticks has included the introduction of plastic or composite shafts which, like aluminum shafts are elongated and generally hollow and are secured to a replaceable blade portion in a similar manner. A variety of methods have been utilized in the construction of such shafts including, among others, pultrusion processes as exemplified by U.S. Pat. No. 4,086,115 issued to Sweet et al. and wrapping processes involving both hoop-laid strands and length-laid strands as exemplified by U.S. Pat. No. 4,591,155 issued to Adachi. Although a limited number of plastic or composite shafts are currently available, they have not been widely accepted as a replacement for aluminum shafts or for the traditional wooden stick. The reasons are believed to be related to the relatively strict functional requirements of such a shaft as well as the cost.

First, the shaft must be relatively light weight to simulate a traditional wooden stick, yet exhibit sufficient strength to withstand the stresses placed on the shaft by the hockey player. Such stresses occur throughout the entire length of the shaft, but particularly at or near the point at which the blade is secured to the lower end of the shaft. Such stresses are increased and the problem compounded as a result of the continuing popularity of the slap shot and the presence of bigger and stronger players.

Second, the shaft must reasonably simulate the flexural, strength and weight characteristics of a wooden stick or be capable of exhibiting the flexural, strength and weight characteristics desired by particular players.

Third, the shaft must meet established safety standards. This generally means that they must be capable of breaking under certain loads and must break in a manner which is no more dangerous to the user or other players than the traditional wooden stick.

Fourth, the shaft must be cost effective so that it can compete favorably with the traditional wooden sticks and with aluminum shafts and replacement blades.

Although various efforts have been made, and efforts are continuing to be made, to design a composite hockey stick shaft to meet the above objectives, none has been totally successful. Accordingly, there is a need in the art for a composite hockey stick shaft which is light weight, or whose weight can be selectively controlled while still providing acceptable strength, which provides the desired flexural characteristics for stick performance, which meets acceptable safety standards and which is also cost effective.

SUMMARY OF THE INVENTION

The present invention relates to a composite hockey stick shaft which is adapted for receiving a replacement blade at one end and a process for making such a shaft. More specifically, the shaft of the present invention is an elongated, hollow shaft of generally rectangular cross sectional configuration which includes an outer molded surface comprised of a plurality of side, top and bottom surfaces and an inner molded surface defining a hollow interior. The inner molded surface is spaced from the outer molded surface to define a shaft body. The shaft body is comprised of a cured resin material and a plurality of elongated filaments spirally wound between the inner and outer molded surfaces and embedded within the cured resin material. At least one end of the hollow interior defines a blade receiving end to receive a replacement blade.

In the preferred embodiment, the plurality of spirally wound filaments includes two sets of elongated filaments of different materials which are spirally wound within the shaft body between the inner and outer molded surfaces. In the most preferred embodiment, one of the sets of filaments is comprised of a glass fiber or filament material, while the other is comprised of a carbon fiber or filament material. The preferred embodiment also contemplates a shaft comprised of about 30–60% by weight of the resin material and about 40–70% by weight of filaments. Most preferably, the shaft is comprised of about 40–50% resin material and about 50–60% filaments.

The process of making the composite hockey stick shaft of the present invention involves, as one step, a filament winding process in which a plurality of filaments are spirally wound onto a mandrel. The mandrel is then loaded into a mold and injected with resin. After curing, the shaft is removed from the mold and the mandrel is removed from the shaft.

More specifically, the process of the present invention involves loading a mandrel into a filament winding machine or apparatus and winding a plurality of continuous filaments at various angles onto such mandrel. Preferably such winding is computer controlled. When the winding of the filaments onto the mandrel has been completed, the filament wound mandrel is removed from the filament winding machine and loaded into a mold structure. The mold structure has an inner molding surface with a size and configuration defining the desired outer molded surface of the composite shaft. The mold is then closed and a curable resin, in liquid form, is injected into the mold cavity between the inner mold surface of the mold structure and the outer surface of the mandrel. The injection of such resin material causes the resin to flow through and impregnate the wound filaments and fill the mold cavity. In the preferred process, the desired shaft configuration, and thus the mold cavity, has a generally rectangular cross-sectional configuration, the resin is injected into the mold along the entire length of the shaft. The mold is configured so that the mold halves join at diametrically opposite corners. Thus, the resin flows across the shaft mold from one corner to a diametrically opposite corner during the injection process.

Following injection of the resin, the resin is allowed to cure in the mold for a specific length of time and at a temperature which will facilitate curing. The mold is then opened and the mandrel and shaft are removed. The molded shaft is then post-cured for a specific time and temperature depending on the particular resin or resins utilized. Following the post-cure, the mandrel is removed and the shaft is trimmed and cleaned.

The filament winding process is such that it can be varied to provide improved and virtually unlimited performance charactreistics. For example, by varying the particular type or types of filaments, the filament or filament bundle size, the number of passes or windings, or the angle at which the filaments are laid, either throughout the entire length of the shaft or at specified locations along the shaft, the characteristics of the shaft can be changed. In a most preferred embodiment, at least one end of the shaft, and preferably both ends, is provided with filament windings at a steeper angle to provide increased hoop strength at such end. This results in added strength to resist blade connection stress. The particular winding angle can also be varied at one or more selected locations along the length of the shaft to provide desired flexural or performance characteristics.

In a preferred aspect of the process, the first and second sets of filaments are comprised of a combination of glass filaments to provide toughness and elongation, while contributing to longitudinal strength and stiffness and carbon filaments to provide higher specific modulus resulting in greater strength and stiffness with a lighter weight. Various other filaments either in addition to or in lieu of the glass and carbon filaments may also be used.

Accordingly, it is an object of the present invention to provide a composite hockey stick shaft which is light weight, but which embodies sufficient strength to resist stresses throughout the shaft and particularly at the replacement blade end.

Another object of the present invention is to provide a composite hockey stick shaft which is capable of providing sufficient strength to resist normal hockey stick stresses, but which also provides desired performance characteristics such as flexural, weight and strength characteristics.

Another object of the present invention is to provide a composite hockey stick shaft adapted for receiving a replacement blade at one end which includes a plurality of elongated, continuous filaments spirally wound within the shaft body.

Another object of the present invention is to provide an improved process for making a composite hockey stick shaft of the type described above.

Another object of the present invention is to provide a process for making a composite hockey stick shaft including filament winding a plurality of filaments spirally onto a mandrel and then molding such filaments within a resin material to form the shaft body.

A still further object of the present invention is to provide an improved process for making a composite hockey stick shaft by which the blade replacement end can be reinforced and the performance characteristics of the shaft can be selectively introduced into the shaft structure.

These and other objects of the present invention will become apparent with reference to the drawings, the description of the preferred embodiment and process and the appended claims.

DESCRIPTION OF THE DRAWINGS

FIG. 1 is a perspective, partially broken apart view of a hockey stick in assembled form incorporating the composite shaft of the present invention and a replacement blade.

FIG. 2 is an enlarged, fragmentary perspective view of the composite shaft of the present invention with a portion broken away.

FIG. 3 is a view, partially in section, of the composite shaft of the present invention as viewed along the section line 3—3 of FIG. 2.

FIG. 4 is a sectional view showing the connection between the composite shaft of the present invention and a replacement blade.

DESCRIPTION OF THE PREFERRED EMBODIMENT AND PROCESS

Figure 5:
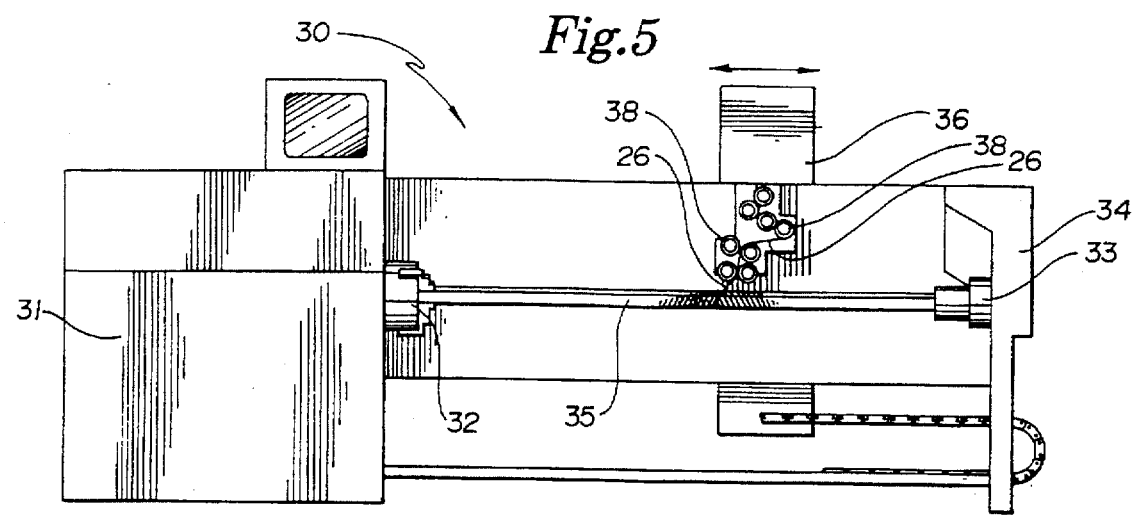
FIG. 5 is a front elevational view of a filament winding machine usable in the process of the present invention.
Figure 6:
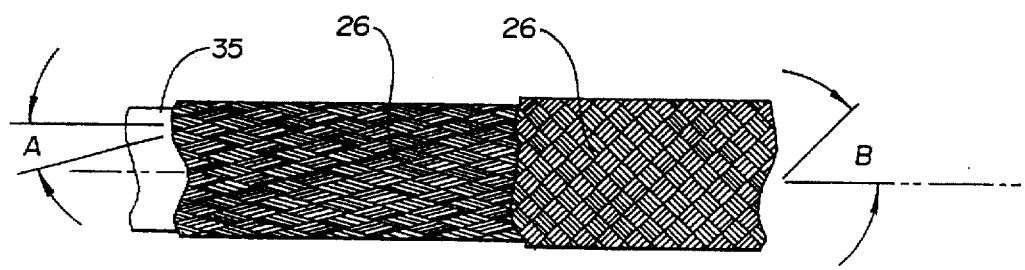
FIG. 6 is a fragmentary view of a portion of a hockey stick shaft showing the filaments wound onto the mandrel and illustrating the angle of application of such filaments relative to the mandrel axis.
Figure 7:
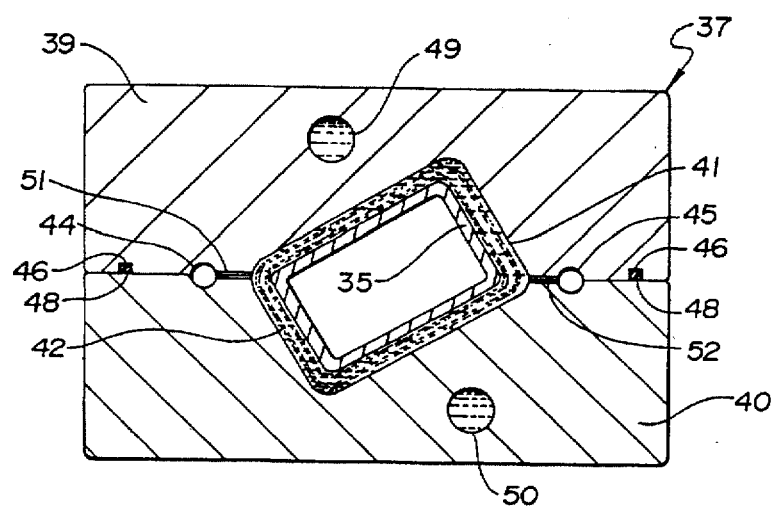
FIG. 7 is a sectional view showing the mold structure and the filament wound mandrel mounted therein.

In the drawings of the present invention, FIGS. 1, 2, 3 and 4 relate principally to the composite shaft of the present invention, while FIGS. 5, 6 and 7 relate principally to the process. All figures, however, facilitate an understanding of both the composite shaft and the process. As used herein, the term "composite" is intended to mean a composite of a cured resin and embedded fibers or filaments.

Reference is first made to FIG. 1 showing a broken apart view of the assembled hockey stick 10 comprising the composite shaft 11 of the present invention and a replacement blade 12. The replacement blade 12 includes a shaft connecting end or tenon 14 for insertion into the hollow blade receiving end 15 of the shaft 11 as will be described in greater detail below.

Reference is next made to FIGS. 2 and 3 illustrating the structural details of the composite shaft of the present invention. The shaft 11 is elongated and is comprised of a shaft body extending throughout its entire length. The shaft body, and thus the shaft 11 includes an outer molded surface defined by a pair of elongated, generally parallel first and second side surfaces 16 and 17 and a pair of elongated, generally parallel top and bottom surfaces 18 and 19, respectively. As illustrated best in FIG. 3, the side surfaces 16 and 17 are spaced from one another and join with the spaced top and bottom surfaces 18 and 19 at generally right angles. The handle 11 formed by the surfaces 16–19 define a generally rectangular shaped cross-sectional configuration. In the preferred embodiment, the corners or junction points 20 between the various surfaces 16–19 are provided with a radius as is conventional for hockey sticks in the prior art.

Spaced inwardly from the outer molded surface is an inner molded surface 21 which defines a hollow interior 22 of the shaft 11. The hollow interior 22 extends throughout the entire length of the shaft. In the preferred embodiment, the inner molded surface 21 has a generally rectangular cross-sectional configuration similar to that of the outer molded surface, but smaller. However, it is contemplated that the inner molded surface could embody various other cross-sectional configurations and still receive the benefits of the present invention. For example, a circular or elliptical inner molded surface could be provided. This would, of course, result in a similarly shaped hollow interior 22.

With specific reference to FIG. 2, one end 15 of shaft 11 is adapted for receiving a replacement blade 12 (FIG. 1). Such end 15 includes a hollow interior surface 24 which in the preferred embodiment is a continuation of the inner mold surface 21 (FIG. 3). The hollow interior surface 24 is provided with a size and configuration to receive the connecting end or tenon 14 (FIG. 1) of the replacement blade 12.

The body of the composite shaft of the present invention is defined by the outer molded surface comprised of the surfaces 16–19 and the inner mold surface 21. In the preferred embodiment, the shaft body is comprised of a cured resin material 25 with a plurality of elongated filaments 26 spirally wound relative to the shaft between the inner and outer molded surfaces and embedded within the cured resin material 25. The present invention is not intended to be limited to any particular resin material, however, the selected resin should be sufficient to provide the desired strength, weight and flexural characteristics to the hockey stick shaft. It is contemplated that various thermoplastic as well as thermoset resins may be utilized. In the preferred embodiment, the resin material is a thermoset epoxy resin which contains the epoxy or oxirane group. The epoxy group is reactive toward a wide range of curing agents or hardeners which are known to those skilled in the art. Other possible resins include the vinyl ester resins, among others.

The plurality of elongated filaments 26 which are embedded within the cured resin material 25 are spirally wound around the shaft between the inner and the outer molded surfaces. The spiral winding of the filaments in accordance with the present invention contemplates a plurality of filaments applied by spiral winding to the shaft at an inclined angle relative to its longitudinal axis. For example, as illustrated in FIG. 6, some of the filaments 26 are wound at an angle "A", while some of the filaments are wound at an angle "B". The angles "A" and "B" which the filaments form with the longitudinal axis 28 of the shaft will depend principally upon the rotational speed of a center mandrel and the translational speed of a filament dispenser carriage as will be more fully described below with respect to the process of the present invention. In the preferred embodiment of the shaft, the plurality of filaments are spirally wound between the inner and outer molded surfaces at one or more selected angles relative to the longitudinal axis of the shaft and for a specified number of winding passes.

The particular number of winding passes of the filaments and the particular angle at which the filaments are laid for a particular stick will depend on the desired characteristics of the stick and the type, character and bundle size of the filaments. Generally, using a combination of glass and carbon filaments as provided in the preferred embodiment, between about 5 and 25 filament passes with a filament angle of between about 50° to 65° are needed to achieve the desired characteristics. As used herein, a "pass" comprises a filament bundle spirally wound from one end of the shaft to the other. Thus, a filament bundle which is spirally wound from one end to the other and then back to the one end will constitute two passes.

In the preferred embodiment, about 10–20 passes are made at an angle of about 50° to 15° followed by 1 to 5 passes at an angle of about 40° to 60°. In the most preferred embodiment, for a shaft of average stiffness, approximately 16 passes of a plurality of filaments are wound at a relatively shallow angle between about 5° and 15° degrees and preferably about 10° with the final two passes wound at an angle of about 40° to 60° and preferably about 45° to 50°.

It has been found that the winding of the filaments at a relatively shallow angle such as the initial windings described above will improve the stiffness and strength of the shaft, while windings at a greater angle will increase the hoop strength of shaft. Accordingly, if it is determined that the blade receiving end of the shaft needs additional hoop strength reinforcement, the angle at which the filaments are laid can be varied to accomplish this. For example, at least some of the filaments at the blade receiving end or ends can be wound at a steeper or larger angle than those wound between the ends. Similarly, if certain stiffness or flexural characteristics are desired within the shaft body, the angle at which some of the filaments are laid at certain locations along the shaft can be varied. For example, by increasing the filament angle at a location and for a specified distance midway between the ends, certain flexural or stiffness characteristics can be imparted to the shaft. It should be noted that the possible variations of shaft characteristics are virtually unlimited when using the process of the present invention.

The particular filaments which are wound about the shaft will also dictate, to some extent, the performance characteristics of the shaft. In the preferred structure, two sets of filaments are laid in which the two sets are filaments of different materials. Specifically, one set of filaments is comprised of glass fibers or filaments such as fiberglass, while the second set of filaments is comprised of carbon or graphite fibers or filaments. Each of the first and second sets of filaments will provide different performance properties to the stick. In the preferred structure, a mixture of glass and carbon filaments is utilized and more specifically, a mixture of between about 20 and 50% by weight glass filaments and between about 50 and 80% by weight carbon filaments is desirable. In the most preferred embodiment, the mixture is about 30–40% glass and about 60–70% carbon.

In the most preferred embodiment, glass filaments are E-glass filaments having approximately 6,000–10,000 filaments per bundle. The carbon filaments are identified as 33-500-12K type filaments. As an alternative, certain carbon/glass hybrids can also be utilized as well as filaments or filament combinations other than glass and carbon including quartz, metallic, aramid and various filament hybrids and combinations.

The shaft of the present invention is constructed of a combination of cured resin and filament so that the finished stick weighs between about 250–500 grams and preferably between about 325 and 425 grams. Of this weight, about 30–60% by weight and most preferably about 40–50% by weight is resin and about 40–70% by weight and most preferably about 50–60% by weight is comprised of the filaments. Thus, regardless of the particular filament bundle size or number of filament windings, the total weight of filaments in the shaft should be about 100–350 grams and preferably between about 130–300 grams. In addition to the filament weight requirement, the shaft body must comprise a minimum number of filament passes. Preferably the number of filament passes should be greater than five and most preferably greater than ten.

The composite shaft of the present invention is adapted for receiving a replacement blade 12 at its blade receiving end 15. To connect the shaft to the blade, the shaft connection end or tenon 14 of the blade 12 is inserted into the blade receiving cavity 24 (FIG. 2) until the tenon 14 is fully inserted as illustrated in FIG. 4. The blade can be retained within the end of the shaft by appropriate adhesive, etc. known in the art.

It should be noted that the filaments embedded within the resin material of the shaft of the present invention consist essentially of spirally wound filaments. The particular type of filament can be altered to some degree to achieve the desired shaft characteristics. Further, the number of filament passes and the angle at which the filaments are spirally would can also be varied to control shaft performance characteristics. The shaft structure, however, is free or substantially free of any hoop filament windings (those which are laid at about 90°) or length-laid filaments (those which are laid at about 0°) or any randomly laid filaments. The shaft can also be used with a hollow center as shown or with a hollow center which has been filled with a core of foam or some other similar material. In the present application a shaft with a hollow interior is intended to mean both a shaft as shown as well as a shaft in which the hollow interior has been filled with a foam or other material.

The process of making the composite shaft of the present invention is illustrated best with reference to FIGS. 5, 6 and 7. The first step in the process is to wind the plurality of continuous filaments onto a supporting mandrel 35. This is accomplished using a filament winding machine 30 illustrated best in FIG. 5. Such filament winding machine 30 is available in the art and includes a control end 31 having a first support spindle means 32. A second end 34 of the machine is provided with a second support spindle means 33. As illustrated in FIG. 5, the mandrel 35 is supported for rotation about its longitudinal axis between the support spindles 32 and 33. The mandrel 35 is an elongated rigid member having an exterior configuration defining the desired inner molded surface 21 of the composite shaft. Although the mandrel 35 can be constructed of a variety of materials, the mandrel of the preferred structure is constructed of stainless steel. Further, the outer surface of the mandrel is slightly tapered to facilitate removal of the mandrel from the shaft following the curing process as will be hereinafter described.

During the winding of the filaments 26, the mandrel 35 is spun at a selected speed by the filament winding machine 30. As the mandrel 35 is spun, a plurality of filaments 26 are fed from a filament dispenser or supply carriage 36 which moves laterally in translational movement back and forth along the length of the mandrel 35. The carriage 36 includes a plurality of filament spools 38 for dispensing filaments onto the mandrel 35. Because of the spinning of the mandrel 35 and the translational movement of the carriage 36, the filaments are spirally laid onto and wound around the mandrel 35 so that the filaments form an angle "A" or "B" (FIG. 6) relative to the longitudinal axis 28 of the mandrel 35 or the shaft. During the winding process, the carriage 36 moves back and forth to wind filaments during a number of passes. Such winding can be computer controlled to not only vary the angle at which a plurality of filaments are laid during a particular pass, but to also vary the filament angle within each pass to reinforce the ends or to provide desired flexural characteristics at selected locations along the shaft body. To achieve the desired shaft characteristics in accordance with the present invention and with the preferred filaments of the present invention, about 5–25 passes with a filament angle of about 5° to 65° are made. In the preferred process, about 10–20 passes are made with filaments applied at an angle between about 5° and 65°. The specific angle of the filaments relative to the axis 28 can be varied during this winding process to achieve desired performance characteristics of the resulting shaft. In the preferred process, about 10–20 passes are initially made at a relatively shallow angle of between about 5° and 15° and most preferably about 10°. This is followed by about 1–5 passes at a steeper angle, preferably between about 40° and 60° and most preferably between about 45° and 50°.

As indicated above in the discussion of the preferred structure, the filaments can be comprised of a plurality of glass, carbon or other filaments or a combination thereof. In the preferred process, two sets of filaments of different materials are utilized. One set of filaments is comprised of glass fibers or filaments, while the other is comprised of graphite or carbon fibers or filaments. In the process of the present invention, both glass and carbon fibers are wound simultaneously onto the mandrel 35, although it is contemplated that the two sets of filaments could be wound separately as well.

As disclosed above, the preferred shaft has certain weight limitations, both with respect to the total shaft weight as well as the weight of the resin and filament components. Certain limitations are also disclosed regarding the weight ratio of resin to filaments. These same limitations are applicable to the process.

It should also be noted that in accordance with the present invention, the mandrel 35 includes only spirally wound filaments and is free or substantially free of filaments which are laid longitudinally at about 0° or filaments which are laid at 90° or various other random angles and locations relative to the mandrel axis.

Following winding of the filaments 26 onto the mandrel 35, the mandrel is loaded into a two part resin transfer mold 37. As illustrated in FIG. 7, the mold is comprised of first and second mold halves 39 and 40, respectively. These mold halves are preferably constructed of aluminum and are capable of receiving the filament wound mandrel 35 in a defined location. The inner mold surfaces 41 and 42 of the mold halves 39 and 40, when placed in molding registration with one another, define the external or outer molded surface dimension and rectangular configuration of the shaft.

The mold halves 39 and 40, when placed together, also define a resin injection port 44 and a vacuum port 45. Both ports 44 and 45 extend substantially the entire length of the mold. The resin injection port 44 functions to provide resin to the mold cavity defined by the surfaces 41 and 42, while the vacuum port 45 functions to remove air and excess resin from the mold cavity. Positioned between the ports 44 and 45 are film gates 51 and 52, respectively. The gates 51 and 52 comprise very small separations between the mold halves to allow uncured resin to pass or flow from the injection port 44 through the gate 51 into the mold cavity and to allow entrapped air and excess resin to pass or flow from the mold cavity through the gate 52 and into the port 45. A pair of O-ring seats 46 and O-rings 48 are provided in the mold half 39 to form a seal between the halves 39 and 40. Each half also includes a heating duct 49 and 50 to conduct hot oil or other fluid for the purpose of heating the mold.

After the filament wound mandrel 35 has been mounted into the mold, the mold is closed by placing the mold halves 39 in face to face registration as illustrated in FIG. 7 and preheating the same to a desired temperature. Such preheating assists in the injection and curing process. When the mold has been sufficiently preheated, it is ready for injection of the resin material. Prior to injection, the mold halves 39 and 40 are placed into a hydraulic press and specific pressure is applied, thus urging the halves toward one another. A resin supply nozzle connected with a resin injection system is then connected with the resin port 44 and the resin material and catalyst is injected into the port 44. The resin and catalyst flows through the entire length of the port 44 and then; because of the supply pressure of the resin flows through the gate 51 and into the mold cavity between the surfaces 41, 42 and the outer surface of the mandrel 35. The resin then flows across the mold cavity from one corner to the diametrically opposite corner. In the preferred process, the resin is supplied at a pressure of about 90–110 pounds per square inch (p.s.i.).

The resin injection system provides means for heating, mixing, metering and dispensing proper ratios of resin and catalyst as desired. During the injection process, a vacuum is applied to the vacuum port 45 to facilitate the flow of resin material across the mold cavity. In the preferred process, a vacuum of about 25–35 mm Hg is provided to the port 45. Injection of resin is continued until the mold cavity is filled, thereby permeating and fully contacting the filaments therein. To insure that the cavity is filled with resin, some excess resin will pass through the gate 52 and into the port 45. During the injection process, the resin and catalyst material are maintained at a temperature at which the resin material is liquid so that it can easily and readily flow into and throughout the mold cavity to permeate the fibers and fully contact the entire inside surfaces of the mold cavity. This is facilitated in part by the heating ducts 49 and 50. As indicated above, the resin material can comprise various a thermoplastic or thermoset resins. In the preferred process, the resin is an epoxy resin.

Following injection of the resin material, the resin is allowed to initially cure within the mold cavity for a specified period of time and at a specified temperature. These variables are selected depending upon the particular resin system utilized. After the initial curing process is complete, the hydraulic press is removed and the mold halves 39 and 40 are separated. The shaft together with the mandrel 35 are then removed. At this time, the mandrel 35 can be immediately removed and the shaft set aside for further post curing or the shaft together with the mandrel 35 can be post cured for a specific time and temperature after which the mandrel can be removed.

Following removal of the mandrel 35 and any post curing that is needed or desired, the shaft 11 is cleaned by removing possible burrs or flash ribs that might have resulted from the seams of the mold halves 39 and 40. The ends of the shaft are then cut to provide a clean edge to define the blade receiving end 15.

Although the description of the preferred embodiment and process has been quite specific, it is contemplated that various modifications could be made without deviating from the spirit of the present invention. Accordingly, it is intended that the scope of the present invention be dictated by the appended claims rather than by the description for the preferred embodiment.

What is claimed is:

1. A process for making a hockey stick shaft adapted for receiving a replacement blade at one end and having an outer molded surface and an inner molded surface defining a shaft interior, said process comprising:

providing a rotatable mandrel having first and second ends;

supporting said mandrel for rotation at its first and second ends in a winding machine;

providing a filament dispensers preparing a spirally wound mandrel, free of resin material, by spirally winding filaments from said filament dispenser onto said mandrel by rotating said mandrel and moving said dispenser reciprocally back and forth relative to said rotating mandrel between said first and second ends for a plurality of passes so that both clockwise and counter-clockwise spiral windings are provided on said mandrel removing said filament wound mandrel from said winding machine;

loading said filament wound mandrel into a mold having an inner mold surface with a size and configuration conforming to the desired outer molded surface of said shaft;

closing the mold to define a mold cavity between the exterior surface of said mandrel and the inner surface of said mold;

injecting a resin material into said mold cavity;

allowing said resin material to cure; and removing said shaft from said mold and said mandrel from said shaft.

2. The process of claim 1 including providing a greater density of filament windings at at least one end to form a reinforced blade receiving end.

3. The process of claim 1 wherein said step of winding includes winding two or more sets of filaments onto said mandrel wherein at least two of said sets of filaments are of different materials.

4. The process of claim 3 wherein one of said sets of filaments is comprised of glass filaments.

5. The process of claim 4 wherein a second of said sets of filaments is comprised of carbon filaments.

6. The process of claim 1 including providing a greater density of filament windings at both ends of said shaft so that one end can be used as a reinforced blade receiving end.

7. The process of claim 1 including trimming at least one end of said shaft after removal of said shaft and said mandrel.

8. The process of claim 1 including providing a different density of filament windings at at least one location between the ends of said shaft for imparting desired strength or flexural characteristics to said shaft.

9. The process of claim 1 including winding about 100 to 350 grams of filaments onto said mandrel.

10. The process of claim 9 including winding about 130–300 grams of filaments onto said mandrel.

11. The process of claim 1 wherein said shaft has a generally rectangular cross-sectional configuration and said step of injecting a resin material includes injecting said resin into said mold cavity along a corner of said generally rectangular configuration.

12. The process of claim 11 including injecting the resin along substantially the entire length of said shaft so that the resin is injected across the cross-sectional configuration of said shaft.

13. The process of claim 1 wherein said of filaments include filaments of more than one material.

14. The process of claim 1 for making a single stick shaft wherein said mandrel has a length for making a single shaft.

15. The process of claim 1 including at least 5 spiral winding passes.

16. The process of claim 1 being a non-continuous process.

17. The process of claim 1 wherein said mandrel is a rigid, straight mandrel of finite length.

18. A process for making a hockey stick shaft, said process comprising:

providing an elongated mandrel having first and second ends;

supporting said mandrel at its first and second ends in a winding machine;

providing a filament dispenser, said mandrel and said filament dispenser being rotatable relative to one another to wind a filament from said dispenser around said mandrel and said mandrel and said filament dispenser being reciprocally moveable back and forth longitudinally relative to one another along said elongated mandrel from one of said first and second ends toward the other of said first and second ends, whereby each relative longitudinal movement of said filament dispenser from one of said first and second ends toward the other during relative rotation of said mandrel and filament dispenser is defined as a pass;

preparing a spirally wound mandrel, free of resin material, by providing a plurality of spiral windings of the filaments from said dispenser onto said mandrel via a plurality of passes so that both clockwise and counter-clockwise spiral windings are provided on said mandrel;

removing said spirally wound mandrel from said winding machine;

injecting resin material around said filament wound mandrel and forming into a cured resin material, with said spiral windings embedded within said cured resin material 19. The process of claim 18 including dispensing a plurality of filaments from said dispenser.

20. The process of claim 19 including dispensing filaments of different materials.

21. The process of claim 20 wherein said materials include a glass based material and a carbon based material.

22. The process of claim 21 wherein said carbon based material is graphite.

23. The process of claim 18 for making a single shaft wherein said mandrel has a length for making a single shaft.

24. The process of claim 18 wherein said hockey stick shaft has an outer generally rectangular cross-sectional configuration with four stick corners and wherein said step of injecting resin material around said filament wound mandrel and forming into a cured resin material includes loading said mandrel into a mold comprising first and second mold parts, said first and second mold parts each having an inner mold surface with a size and configuration conforming to a corresponding portion of the desired outer generally rectangular cross-sectional configuration of said shaft;

closing the mold to define a mold cavity extending the entire length of said mandrel between said mandrel and the inner surfaces of said first and second mold parts, said cavity having a generally rectangular cross-sectional configuration with four mold corners extending the entire length of said cavity, said four mold corners corresponding to said four stick corners;

injecting a resin material into said mold cavity along one mold corner allowing said resin material to cure; and removing the shaft from said mold.

25. The process of claim 24 including injecting the resin along substantially the entire length of said cavity so that the resin is injected across the cross-sectional configuration of said cavity.

26. The process of claim 25 including exhausting air from said cavity from a mold corner diametrically opposite from said one mold corner.

27. The process of claim 24 wherein said reinforcement material includes a plurality of spirally wound filaments.

28. The process of claim 18 being a non-continuous process.

29. The process of claim 18 wherein said mandrel is a rigid, straight mandrel of finite length.

* * * * *

UNITED STATES PATENT AND TRADEMARK OFFICE
CERTIFICATE OF CORRECTION

PATENT NO. : 5,746,955
DATED : May 5, 1998
INVENTOR(S) : David E. Calapp et al.

It is certified that error appears in the above-identified patent and that said Letters Patent is hereby corrected as shown below:

| Column | Line | Reads | Should Read |
|--------|------|-------|-------------|
| 5 | 66 | 50° | --5°-- |
| 9 | 67 | dispensers | --dispenser;-- |
| 10 | 8 | mandrel removing | --mandrel; removing-- (removing should begin a new paragraph) |

Signed and Sealed this

Nineteenth Day of January, 1999

Attest:

Attesting Officer

*Acting Commissioner of Patents and Trademarks*